United States Patent
Hirschfeld et al.

(10) Patent No.: US 11,424,472 B2
(45) Date of Patent: Aug. 23, 2022

(54) TESTING DEVICE FOR A FUEL CELL STACK

(71) Applicant: Bayerische Motoren Werke Aktiengesellschaft, Munich (DE)

(72) Inventors: Julian Arndt Hirschfeld, Munich (DE); Johannes Schmid, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 360 days.

(21) Appl. No.: 16/704,105

(22) Filed: Dec. 5, 2019

(65) Prior Publication Data
US 2020/0112046 A1 Apr. 9, 2020

Related U.S. Application Data

(63) Continuation of application No. PCT/EP2018/065479, filed on Jun. 12, 2018.

(30) Foreign Application Priority Data

Jul. 26, 2017 (DE) ...................... 10 2017 212 884.4

(51) Int. Cl.
| | |
|---|---|
| *H01M 8/2465* | (2016.01) |
| *H01M 8/0273* | (2016.01) |
| *H01M 8/04746* | (2016.01) |

(52) U.S. Cl.
CPC ....... *H01M 8/2465* (2013.01); *H01M 8/0273* (2013.01); *H01M 8/04753* (2013.01)

(58) Field of Classification Search
CPC ............. H01M 8/0273; H01M 8/0438; H01M 8/04432; H01M 8/04537; H01M 8/04664;
(Continued)

(56) References Cited

U.S. PATENT DOCUMENTS

| | | |
|---|---|---|
| 2008/0042654 A1 | 2/2008 | Kato |
| 2010/0047632 A1 | 2/2010 | Lawrence et al. |

(Continued)

FOREIGN PATENT DOCUMENTS

| | | |
|---|---|---|
| CN | 1866599 A | 11/2006 |
| DE | 10 2007 030 037 A1 | 1/2008 |

(Continued)

OTHER PUBLICATIONS

International Search Report (PCT/ISA/210) issued in PCT Application No. PCT/EP2018/065479 dated Sep. 5, 2018 with English translation (five (5) pages).

(Continued)

*Primary Examiner* — Brittany L Raymond
(74) *Attorney, Agent, or Firm* — Crowell & Moring LLP

(57) ABSTRACT

A testing device for a fuel cell stack has multiple fuel cells which are stacked along a stack axis with each having media openings in the form of through-holes. Corresponding media openings align to form media lines when in the stacked state. The testing device has a rod which can be introduced into a media line, and at least one sealing element which is arranged on the rod to seal off the media line and to isolate at least one fuel cell of the fuel cell stack from the other fuel cells, and/or at least one contact element which can be introduced with the rod to make electrical contact with an individual fuel cell inside the media line.

12 Claims, 4 Drawing Sheets

(58) Field of Classification Search
CPC ......... H01M 8/04679; H01M 8/04753; H01M 8/2465; H01M 2008/1095; Y02E 60/50
See application file for complete search history.

(56) References Cited

U.S. PATENT DOCUMENTS

2012/0225366 A1* 9/2012 Suto .................. H01M 8/04552
                                                         429/432
2013/0029245 A1* 1/2013 Fisher ............... H01M 8/04552
                                                         429/467

FOREIGN PATENT DOCUMENTS

| DE | 10 2007 008 268 A1 | 8/2008 |
| DE | 10 2015 207 167 A1 | 10/2016 |
| EP | 2 330 673 A2 | 6/2011 |
| JP | 2009-295511 A | 12/2009 |
| KR | 10-2012-0050132 A | 5/2012 |

OTHER PUBLICATIONS

German-language Written Opinion (PCT/ISA/237) issued in PCT Application No. PCT/EP2018/065479 dated Sep. 5, 2018 (seven (7) pages).
German-language Search Report issued in counterpart German Application No. 10 2017 212 884.4 dated Apr. 17, 2018 with partial English translation (10 pages).
Chinese-language Office Action issued in Chinese Application No. 201880043977.8 dated Apr. 7, 2022 with English translation (16 pages).

* cited by examiner

TESTING DEVICE FOR A FUEL CELL STACK

CROSS REFERENCE TO RELATED APPLICATIONS

This application is a continuation of PCT International Application No. PCT/EP2018/065479, filed Jun. 12, 2018, which claims priority under 35 U.S.C. § 119 from German Patent Application No. 10 2017 212 884.4, filed Jul. 26, 2017, the entire disclosures of which are herein expressly incorporated by reference.

BACKGROUND AND SUMMARY OF THE INVENTION

The present technology relates to a testing device for testing a fuel cell stack and to a corresponding method for testing the fuel cell stack.

A fuel cell stack conventionally comprises a plurality of stacked fuel cells. End plates are located at the end-side ends of the fuel cell stack. The end plates may also be referred to as pressure plates. At least one of the end plates can be designed as a media plate and serves for supplying or discharging the corresponding media to/from the fuel cell stack. The media involved are fuel, oxidant and optionally cooling liquid.

The edge region of the individual fuel cell has a plurality of media openings. The media openings are through-apertures. In the stacked state, the corresponding media openings of the different fuel cells are aligned and thereby form a media line. At least four media lines are conventionally provided: for supplying or discharging the fuel and for supplying or discharging the oxidant. When a cooling circuit is used, six media lines are provided. Accordingly, the individual fuel cell has four or six media openings.

In test stands for fuel cells, either entire fuel cell stacks or partial stacks are checked. All of the fuel cells in the respective stack are simultaneously checked in this case. During the checking, the stack is acted upon, for example, via the media lines, with a liquid or gaseous fluid in order to measure the tightness, a flow rate or a pressure drop. Furthermore, in the test stand, electrical contact can be made with the fuel cells from the outside in order to carry out a short-circuit measurement.

It is a preferred object of the technology disclosed here to reduce or to eliminate at least one disadvantage of a previously known solution or to propose an alternative solution. In particular, it is an object of the technology disclosed here to propose a testing device and a corresponding method, which make it possible to test individual fuel cells within a stack simply and efficiently. Further preferred objects may emerge from the advantageous effects of the technology disclosed here. The object(s) is/are achieved by the subject matter of the independent patent claims. The dependent claims are preferred refinements.

The technology disclosed here relates, inter alia, to a fuel cell stack of part of a fuel cell system. The fuel cell system is conceived of, for example, for mobile applications, such as a motor vehicle, in particular for providing the energy for at least one drive engine for moving the motor vehicle. In its simplest form, a fuel cell is an electrochemical energy converter which converts fuel and oxidant into reaction products and, in the process, produces electricity and heat. The fuel cell comprises an anode and a cathode which is separated by an ion-selective or ion-permeable separator. The anode is supplied with fuel. Preferred fuels are: hydrogen, low-molecular alcohol, biofuels, or liquefied natural gas. The cathode is supplied with oxidants. Preferred oxidants are, for example, air, oxygen and peroxides. The ion-selective separator can be designed, for example, as a proton exchange membrane (PEM). A cation-selective polymeric electrolyte membrane is preferably used. Examples of materials for such a membrane are Nafion®, Flemion® and Aciplex®.

In addition to the at least one fuel cell, a fuel cell system preferably comprises peripheral system components (BOP components) which can be used during the operation of the at least one fuel cell. The fuel cells of the fuel cell system generally comprise two separator plates. The ion-selective separator of a fuel cell is generally arranged in each case between two separator plates. The one separator plate together with the ion-selective separator forms the anode. Meanwhile, the further separator plate arranged on the opposite side of the ion-selective separator together with the ion-selective separator forms the cathode. Preferably, gas channels for fuel or for oxidants are provided in the separator plates. The separator plates can be designed as monopolar plates and/or as bipolar plates. In other words, a separator plate expediently has two sides, wherein the one side together with an ion-selective separator forms an anode and a second side together with a further ion-selective separator of an adjacent fuel cell forms a cathode.

The object is achieved by a testing device designed for checking individual fuel cells in a fuel cell stack. The fuel cell stack to be checked comprises a plurality of fuel cells stacked along a stack axis. This can involve a partial stack, wherein a plurality of the partial stacks are assembled to form an overall stack. Furthermore, the overall stack, optionally with further stack elements, such as, for example, end plates, current collector plates and insulation plates, can also be subjected to the testing.

The fuel cells each comprise media openings in the form of through-apertures. In the stacked state, corresponding media openings are aligned and thereby form the media lines, parallel to the stack axis. The testing device is introduced into one of said media lines. Media channels which run perpendicularly to the stack axis are formed in the individual fuel cells. The media channels connect associated media lines, for example the media line for the inflow of the oxidant to the media line for the outflow of the oxidant.

The testing device comprises a rod to be introduced into the media line. At least one sealing element is arranged on said rod and is introduced with the rod into the media line. In the media line, the sealing element seals the media line and therefore separates at least one fuel cell from the rest of the fuel cells. Said at least one separated fuel cell is located in a region of the media line that is referred to here as the testing section. One fuel cell or a plurality of fuel cells to be checked can lie in said testing section.

In particular, a further sealing element is provided in order to seal the testing section on both sides. In a simple refinement of the testing device, said second sealing element lies outside the media line and does not inevitably have to be located on the rod of the testing device. As will also be described with reference to a preferred refinement, at least two sealing elements are preferably, however, introduced with the rod into the media line such that any desired number of fuel cells can be separated at any desired point within the fuel cell stack.

The separating of the at least one fuel cell from the further fuel cells makes it possible to act only upon the at least one separated fuel cell with a fluid. A gaseous or liquid fluid can be used here. The fluid flows via the separated testing section of the media line through the media channels formed in the fuel cells into the associated media line on the other side. It is also described with reference to the method presented here that in particular use is made of two of the testing devices which seal identical testing sections in the two media lines which are connected via media channels.

Additionally or alternatively to the at least one sealing element, the testing device comprises at least one contact element. The contact element is introduced together with the rod into the media line and thus makes contact with the desired fuel cell. The contact element permits an electrically conductive contact with the respective fuel cell. A second electrical contact with the fuel cell stack can basically take place at any desired point. An individual fuel cell or a plurality of fuel cells of the fuel cell stack can thus be checked by means of a short-circuit measurement.

In a preferred embodiment, it is provided that at least two spaced-apart sealing elements are arranged on the rod. The two sealing elements serve for sealing the media line. As described, at least one of the two sealing elements is introduced with the rod into the media line and seals the media line within the media line. The second sealing element on the rod can also be positioned on the outside of the fuel cell stack and can therefore seal the outer end of the media line.

However, it is particularly preferably provided that the at least two sealing elements can be introduced together with the rod into the media line. The testing section and therefore the at least one separated fuel cell are located between said two sealing elements. Owing to the two sealing elements being able to be introduced with the rod into the media line, any desired number of fuel cells can be separated at any desired point within the fuel cell stack.

The rod preferably has a fluid opening, in particular between the two sealing elements arranged thereon. In or on the rod, a fluid line runs outward from the fluid opening. A fluid can be supplied into or discharged from the testing section of the media line via said fluid line and the fluid opening. The use of said fluid permits, for example, a measurement of tightness, a measurement of the flow rate or the measurement of a pressure drop at the at least one separated fuel cell.

In a preferred refinement, at least three spaced-apart sealing elements are arranged on the rod. A dedicated testing section which separates at least one fuel cell from the further fuel cells is in each case located between two sealing elements. As a result, at least two testing sections can be checked simultaneously with just one operation.

It is particularly preferably provided that the rod for each individual testing section has a dedicated fluid opening and a dedicated fluid line leading to the fluid opening.

Precise refinements of the sealing elements will be described below. Said refinements can also be combined on a testing device, and therefore the plurality of sealing elements of a testing device can be configured differently.

The sealing elements can preferably be inflated to provide sealing. For this purpose, the sealing element is, for example, in the form of an inflatable balloon or an inflatable ring. An actuating device, in particular with a pressure line, for inflating the sealing element is preferably integrated in the rod.

Furthermore, it is preferably provided that the sealing element is connected to the rod via a corresponding mechanism, wherein the mechanism permits radial retraction and extension of the sealing element. This mechanism is also preferably actuated via an actuating device integrated in the rod.

In a further variant, it is provided that the sealing element comprises at least one elastic annular sealing lip. The size, in particular the extent, and the shape of the sealing lip correspond to the media opening of the media line. The size of the sealing element with the sealing lip cannot be changed. The sealing lip is appropriately elastic, and therefore it can be pushed through the individual media openings as far as the desired point when the testing device is introduced. In particular, the individual sealing element has two concentric sealing lips, wherein, in the sealed state, the media opening or the edge of the media opening is located between the two sealing lips.

The sealing element in all of the described variants is preferably arranged displaceably on the rod and can be fixed to the rod at various points of the rod. The size of the testing section can thereby be varied.

For the electrical checking, the testing device preferably comprises at least two spaced-apart contact elements for making electrical contact with at least two different fuel cells in the media line. The contact elements are arranged in such a manner that they can be introduced together with the rod into the media line. Depending on the size set for the testing section, one or more of the fuel cells lies/lie between the two contact elements. The short-circuit measurement takes place in each case between two contact elements.

The individual contact element is particularly preferably arranged on the sealing element. For this purpose, for example, the outer circumference of the sealing element is designed to be electrically conductive. As a result, electrical contact with the desired fuel cell is made simultaneously with the positioning of the sealing element at the desired point.

Furthermore, it is preferably provided to design the contact element as a sliding contact. In the case of the sealing element with an elastic sealing lip, the contact element designed as a sliding contact can be arranged on the sealing lip. The contact element slides on the individual fuel cells when the testing device is introduced into the media line. As soon as the testing device is positioned at the desired point, the sliding contact makes contact with the desired fuel cell. As an alternative thereto, it is also possible to arrange the sliding contact on the rod independently of the sealing element. In this case too, the contact element slides on the individual fuel cells when the testing device is introduced and, as soon as the testing device is positioned at the desired point, contact is made with the desired fuel cell.

A detection unit is preferably located on the rod of the testing device. Said detection unit is introduced together with the rod into the media line. The detection unit is, for example, a camera, an optical waveguide or a corresponding sensor. The detection unit is designed to identify the individual fuel cells within the media line. Due to manufacturing tolerances, the individual fuel cells may differ in height (pitch). The actual position of the rod relative to the individual fuel cells can be identified by means of the detection unit. This permits a highly precise positioning of the at least one sealing element or of the at least one contact element within the media line. The camera or the optical waveguide of the detection unit additionally has the advantage that further errors, for example foreign bodies, particles or an offset within the fuel cell stack, can thus be identified.

In order to check the fuel cell stack, use is preferably made of an arrangement of two of the testing devices. The two testing devices are arranged on a testing receptacle at a fixed distance from each other. The two rods stand parallel to each other and parallel to the stack axis. It can be ensured by means of the fixed position of the two testing devices with respect to each other that the two testing devices can be introduced precisely at equal distances into the associated media lines.

The invention furthermore comprises a method for testing the fuel cell stack. In particular, at least one of the described testing devices is used for this purpose. The dependent claims and advantageous refinements presented within the scope of the testing device correspondingly advantageously apply to the method.

In the method, first of all a testing device is introduced into one of the media lines of the fuel cell stack. In the media line, the media line is sealed at a desired point by means of the testing device in order to separate at least one fuel cell from the rest of the fuel cells. The separated testing section of the media line is then acted upon with a liquid or gaseous fluid. A measurement of the tightness and/or measurement of the flow rate and/or measurement of the pressure drop takes place with reference to the fluid.

Additionally or alternatively to the sealing and introduction of a fluid, contact is made electrically with an individual fuel cell within the media line by the testing device. Furthermore, contact can be made in an electrically conductive manner with the fuel cell stack at any desired further point. A short-circuit measurement between the two contacts takes place.

Particularly preferably, two of the testing devices, in particular two testing devices as have been described in detail here, are introduced into two media lines of the fuel cell stack. This involves two associated media lines which are connected by media channels. Said media channels run through the fuel cells perpendicularly to the stack axis. The same testing sections, i.e. the same fuel cells, in the two media lines are separated with the two testing devices.

As already described, the rods of the testing devices preferably have fluid openings and fluid lines in order, during the testing, to conduct a corresponding fluid into, or to discharge same from, the testing section which is separated by the sealing elements. When the two testing devices are used, the fluid flows from the one testing device through the media channel of the at least one separated fuel cell into the other testing device.

By means of a corresponding arrangement of the sealing elements on the rod of the testing device, individual fuel cells or a plurality of fuel cells can be separated. It is provided in particular to separate and to check a plurality of fuel cells in a first step. Should an error be identified at said plurality of separated fuel cells, the testing section is reduced in size in order step by step to determine the erroneous fuel cell.

Furthermore, it is preferably provided to determine whether the sealing elements are correctly positioned, on the basis of pressure values and/or flow rate values of the fluid flowing via the at least one testing device. If, for example, it is provided to separate just one fuel cell and if an unusually high flow rate is measured, it can be concluded from this that the sealing elements are not correctly positioned and more than one fuel cell has been separated.

Furthermore, it is preferably provided to check the positioning of the testing device within the media line from the outside by way of x-rays.

The individual testing device preferably has at least two of the contact elements, wherein the at least two contact elements are introduced into the media line. At least two different fuel cells are made contact in an electrically conductive manner by the at least two contact elements in order to carry out a short-circuit measurement. When a voltage of correspondingly a plate capacitor is applied, the at least one fuel cell is charged up. From the known distance of the bipolar plates of the fuel cells from one another and the known dielectric constant, with a constant resistance of the membrane electrode unit being assumed, a contact resistance of the individual bipolar plates with respect to one another can be determined with reference to the rising behavior of the measured resistance.

The fuel cells, in particular the individual bipolar plates, conventionally have connections on the outer side for a cell monitoring system. If said cell monitoring system is already connected, a current flow into the cell monitoring system from the interior of the media line can be generated via the at least one contact element of the testing device. It is thereby possible to check, for example, that the cell monitoring system is in correct contact with the connection.

The two testing devices can be introduced into the media lines from the same side or from the two opposite sides. This is possible in particular as long as the one side of the fuel cell stack is not yet closed by an end plate.

It is preferably provided to carry out the method described here during the construction of the fuel cell stack. During the construction of the fuel cell stack, individual fuel cells or partial stacks are placed one above another step by step and are acted upon with a press. The at least one testing device preferably sits in the media line while the fuel cells are stacked and are acted upon with the press. Defective fuel cells can thus be identified during the construction of the fuel cell stack and replaced before the fuel cell stack is finished.

Other objects, advantages and novel features of the present invention will become apparent from the following detailed description of one or more preferred embodiments when considered in conjunction with the accompanying drawings.

DETAILED DESCRIPTION OF THE DRAWINGS

The figures purely schematically show a testing device 1 for testing a fuel cell stack 20. The testing method presented here is carried out by use of the testing device 1 shown.

Figure 1:
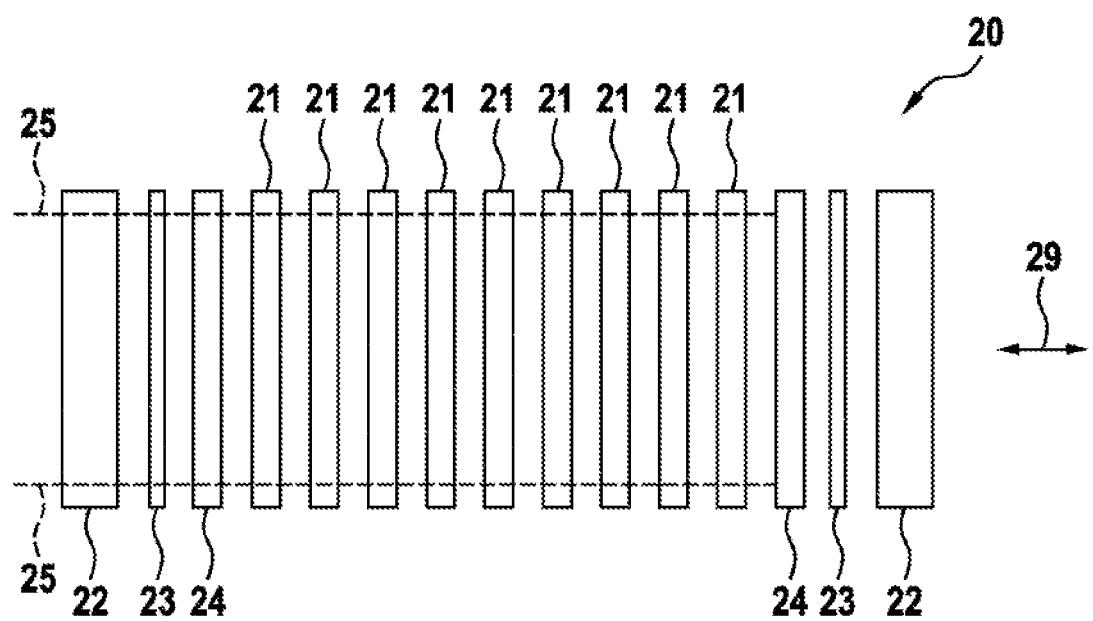
FIG. 1 shows a fuel cell stack to be tested.

FIG. 1 purely schematically shows the fuel cell stack 20 with fuel cells 21, current collector plates 24, insulation plates 23 and end plates 22. The individual stack elements of the fuel cell stack 20 are stacked along a stack axis 29.

One of the end plates 22, in the form of a media plate, is located on an end side of the fuel cell stack 20. Via said end plate 22, the media is supplied to the fuel cell stack 20 and the media is discharged from the fuel cell stack 20.

The current collector plates 24 are located between the fuel cells 21 and the end plates 22. The current collector plates 24 are electrically insulated from the end plates 22 via insulation plates 23.

A plurality of media openings 26 (see FIG. 2) are in each case formed in the end plate 22, which is designed as a media plate, in the fuel cells 21 and in the insulation plate 23 and current collector plate 24 that lie inbetween. Corresponding media openings 26 are aligned in the fuel cell stack 20 and thereby form media lines 25 which are oriented parallel to the stack axis 29.

Figure 2:
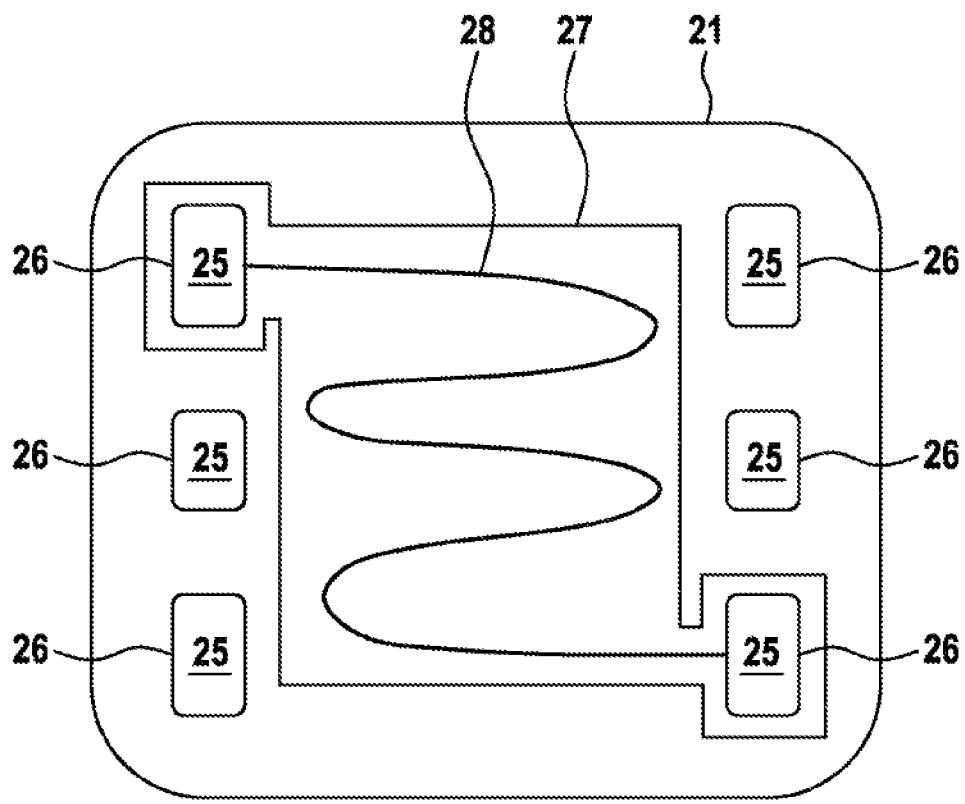
FIG. 2 shows an individual fuel cell.

FIG. 2 shows an individual fuel cell 21 in a plane perpendicular to the stack axis 29. The part of the fuel cell 21 that is relevant here, namely the separator plate or bipolar plate, can be seen. On the side shown, two of the media openings 26 which form two associated media lines 25 in the fuel cell stack 20 are surrounded by a sealing line 27. The two media openings 26 are connected via a media channel 28 which meanders perpendicularly to the stack axis 29.

Conventionally, the media lines 25 for the inflow and outflow of the oxidant on the one side of the separator plate and the media lines 25 for the inflow and outflow of the fuel on the other side are connected via corresponding media channels 28. In the interior of the separator plate, the cooling liquid conventionally flows via media channels 28 between the two corresponding media lines 25.

Figure 3:
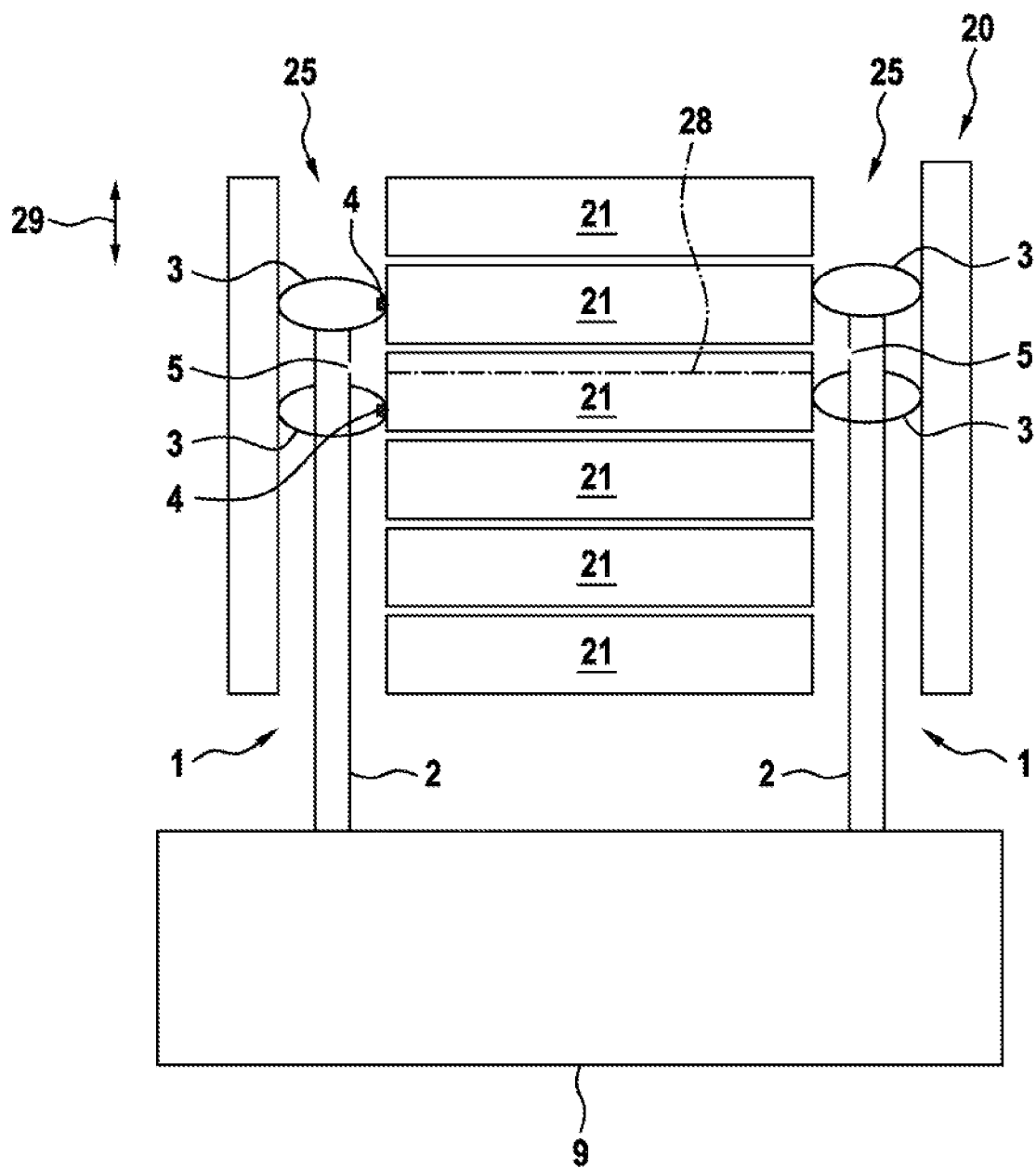
FIG. 3 shows the testing device presented here in the fuel cell stack.

FIG. 3 purely schematically shows a section through the fuel cell stack 20. Two associated media lines 25, for example the two media lines 25 for the oxidant, can be seen here.

Furthermore, FIG. 3 shows two of the testing devices 1. The individual testing device 1 has a rod 2. The rod 2 stands parallel to the stack axis 29 and can be introduced into the media line 25.

Two sealing elements 3 are located on the rod 2. The two sealing elements 3 are spaced apart from each other. What is referred to as a testing section is defined between the two sealing elements 3.

A fluid opening 5 is formed in the rod 2. When the test is being carried out, a corresponding fluid can be introduced into the testing section between the two sealing elements 3, or discharged from there, via said fluid opening 5.

Furthermore, at least one of the two testing devices 1 has contact elements 4. In the example shown, said contact elements 4 for making electrical contact with the fuel cells 21 are located on the outer circumference of the sealing elements 3.

The two testing devices 1 are positioned at a fixed distance from each other via a testing receptacle 9.

Figure 4:
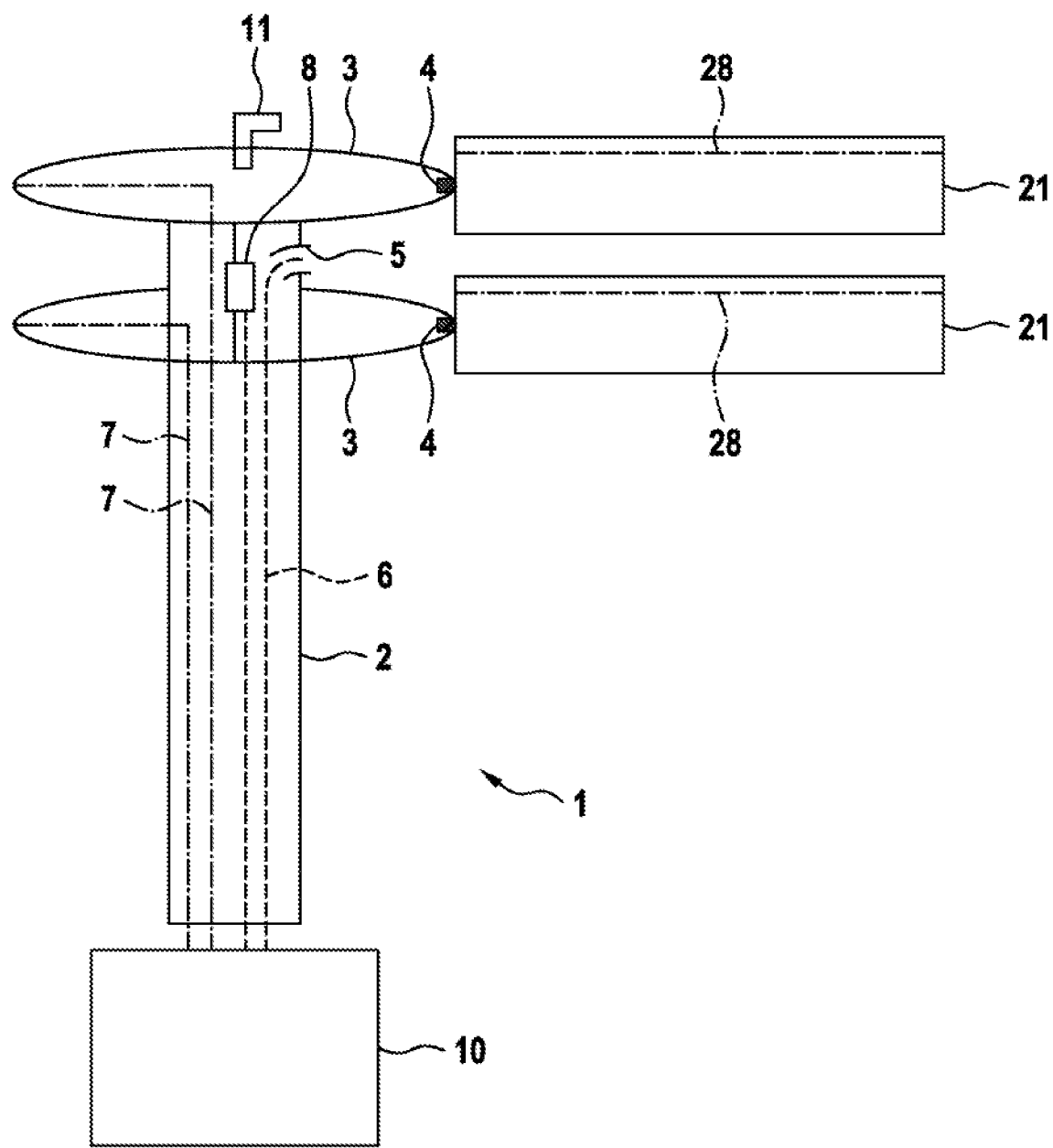
FIG. 4 shows the testing device in detail.

FIG. 4 shows an individual testing device 1 in detail. It is purely schematically illustrated here that a fluid line 6 leads outward from the fluid opening 5. In particular, said fluid line 6 runs in the interior of the rod 2. The fluid exchange with the testing section between the two sealing elements 3 is possible via the fluid line 6.

Furthermore, the schematic illustration in FIG. 4 shows that the contact elements 4 are located on the electrically conductive circumference of the sealing element 3. Said electrically conductive circumference of the sealing element 3 is connected in an electrically conductive manner to an electrical line 7. The electrical line 7 leads outward, in particular through the rod 2.

FIG. 4 shows an actuating device 8 likewise purely schematically. The actuating device 8 is actuable from the outside via a corresponding line or mechanical connection. Said line or mechanical connection also runs through the rod 2.

The individual sealing element 3 is configured, for example, so as to be inflatable. Accordingly, in particular a pressure line leads to the actuating device 8. The inflating pressure can be guided to the sealing elements 3 via the actuating device 8. As an alternative thereto, it is also possible, for example, to mechanically retract and extend the individual sealing element 3 radially with respect to the rod 2 via the actuating device 8.

At least one testing apparatus 10 is located outside the media line 25. The electrical line 7 and/or the fluid line 6 and/or the lines or mechanical connections of the actuating device 8 preferably lead to said at least one testing apparatus 10.

The testing apparatus 10 is preferably designed to apply a corresponding voltage to the contact elements 4 and/or to evaluate a measured electrical signal.

The testing apparatus 10 is preferably designed to actuate the actuating device 8 in order to bring the sealing elements 3 into their sealing position.

The testing apparatus 10 is preferably designed to conduct a fluid into the testing section between the two sealing elements 3 and/or to measure pressure changes or flow quantities of the fluid.

FIG. 4 purely schematically shows a detection unit 11 of the testing device 1. The detection unit 11 is introduced together with the rod 2 into the media line 25. The detection unit 11 is located in particular on the rod 2 or on one of the sealing elements 3. The detection unit 11 is, for example, a camera. The position at which the testing device 1, in particular the sealing elements 3, is/are located can be checked by use of said camera.

FIGS. 3 and 4 show a positioning of the sealing elements 3 on the rod 2 with a testing section in which just one fuel cell 21 or a media channel 28 is located. However, it is also possible to space the two sealing elements 3 further from each other such that a plurality of fuel cells 21 are separated and checked with one operation.

Figure 5:
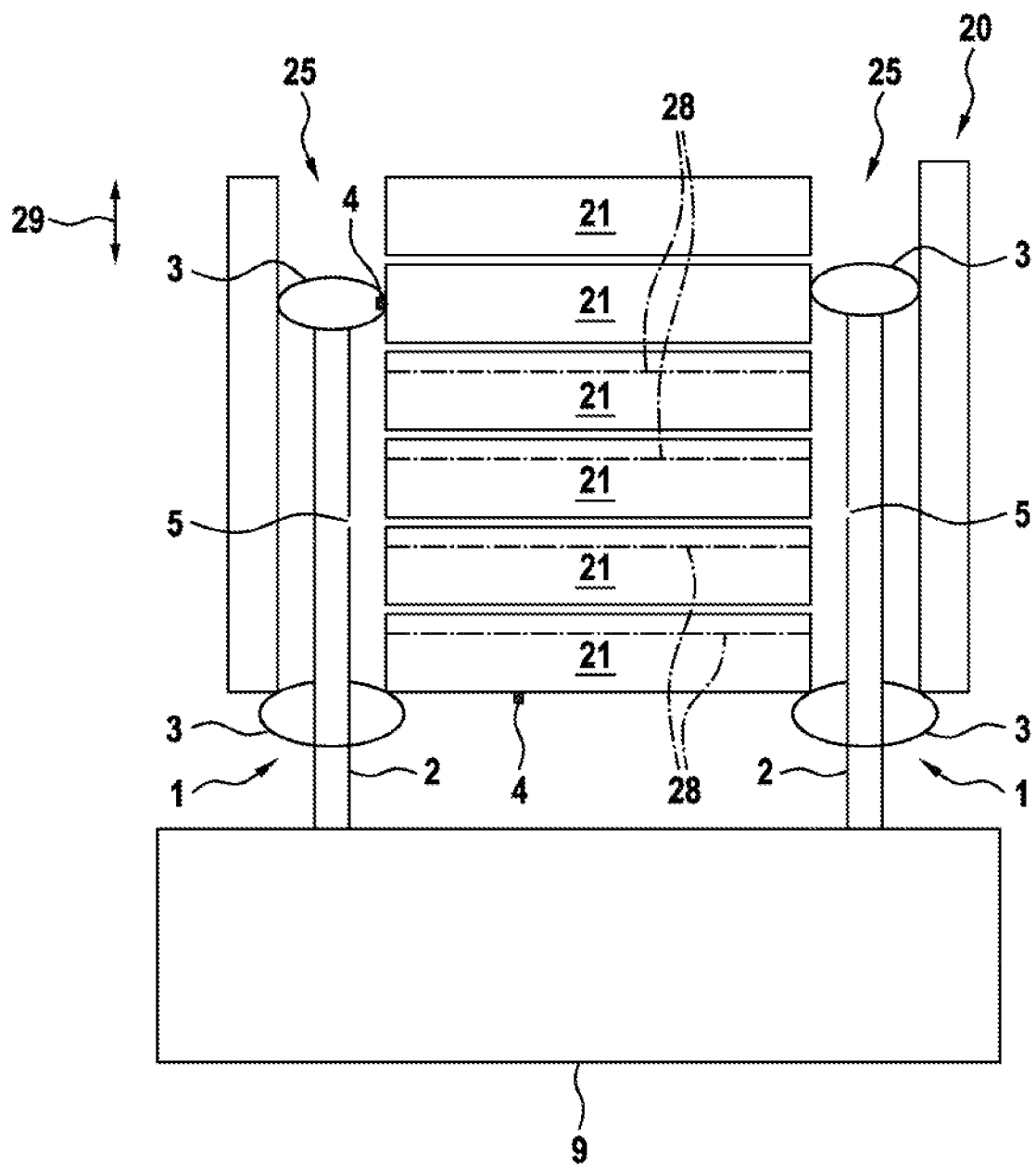
FIG. 5 shows a variant of the testing device in the fuel cell stack.

FIG. 5 shows a simplified variant of the testing device 1. In this testing device 1, just one sealing element 3 which is introduced into the media line 25 is located on the rod 2. The media line 25 is closed on the outer side by the other sealing element 3. Said outer sealing element 3 can likewise be located on the rod 2, but is not introduced into the media line 25. It is also possible by means of this simplified design to separate and to check individual fuel cells 21.

In particular, it is provided that the rod 2 can be guided in a slidable manner through the outer sealing element 3. The testing section can thereby be increased or reduced in size by individual fuel cells 21 step by step. The outer sealing element 3 remains in situ here. The inner sealing element 3 is moved with the rod 2.

Furthermore, FIG. 5 shows that the testing device 1 has only one contact element 4. A further contact element 4 is located at any desired point of the fuel cell stack 20. A short-circuit measurement at only selected fuel cells 21 is thus also possible.

LIST OF REFERENCE SIGNS

1 Testing device
2 Rod
3 Sealing element
4 Contact element
5 Fluid opening
6 Fluid line
7 Electrical lines
8 Actuating device
9 Testing receptacle
10 Testing apparatus
11 Detection unit
20 Fuel cell stack
21 Fuel cells
22 End plate
23 Insulation plate
24 Current collector plate 25 Media line
26 Media opening
27 Sealing line
28 Media channel
29 Stack axis The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A testing device for a fuel cell stack, wherein the fuel cell stack comprises a plurality of fuel cells which are stacked along a stack axis and each have media openings in a form of through-apertures, and wherein, in a stacked state, corresponding media openings align to form media lines, wherein the testing device comprises:
   a rod which is introducible into a media line; and
   at least three spaced-apart sealing elements arranged on the rod for sealing the media line in order to isolate at least one fuel cell of the fuel cell stack from remaining fuel cells and to form at least two testing sections, each with at least one separated fuel cell; and/or
   at least one contact element which is introducible with the rod for making electrical contact with an individual fuel cell within the media line,
   wherein a fluid opening is formed on each of the at least two testing sections, and
   for each of the at least two testing sections, the rod comprises a fluid line which is connected to the fluid opening.

2. The testing device according to claim 1, wherein the at least three spaced-apart sealing elements are introducible with the rod into the media line.

3. The testing device according to claim 1, wherein the at least three spaced-apart sealing elements are inflatable to provide sealing.

4. The testing device according to claim 1, wherein the at least three spaced-apart sealing elements are retractable and extendable radially with respect to the rod.

5. The testing device according to claim 1, wherein each of the at least three spaced-apart sealing elements comprise at least one elastic annular sealing lip, a size and shape of which correspond to the media openings of the media line.

6. The testing device according to claim 1, further comprising:
   at least two spaced-apart contact elements for simultaneously making contact with two fuel cells in the media line.

7. The testing device according to claim 1, wherein the at least one contact element is arranged on one of the at least three spaced-apart sealing elements.

8. The testing device according to claim 1, wherein the at least one contact element is a sliding contact which slides on the fuel cells when the rod is introduced.

9. The testing device according to claim 1, further comprising:
   a detection unit arranged on the rod that detects a position of the rod relative to an individual fuel cell.

10. The testing device according to claim 9, wherein the detection unit is a sensor or camera.

11. A method for testing a fuel cell stack, wherein the fuel cell stack comprises a plurality of fuel cells which are stacked along a stack axis and each have media openings in a form of through-apertures, and wherein, in a stacked state, corresponding media openings align to form media lines, wherein the method comprises:
   introducing a testing device into one of the media lines;
   sealing the media line with the testing device in order to isolate at least one fuel cell of the fuel cell stack from remaining fuel cells, and acting upon the at least one isolated fuel cell with a fluid for measuring tightness, measuring flow rate or measuring pressure drop, and/or
   making electrical contact with an individual fuel cell within the media line with the testing device, making electrical contact with the fuel cell stack at a further point, and carrying out a short circuit measurement between the two contacts.

12. The method according to claim 11, wherein
two testing devices are introduced respectively into two media lines,
the two media lines are connected via media channels which run in the fuel cells perpendicularly to the stack axis, and
with the two testing devices, the same at least one fuel cell of the fuel cell stack is separated from the remaining fuel cells.

* * * * *